United States Patent
Bitran et al.

(10) Patent No.: US 9,519,756 B2
(45) Date of Patent: Dec. 13, 2016

(54) MANAGING POLICY AND PERMISSIONS PROFILES

(71) Applicant: MICROSOFT CORPORATION, Redmond, WA (US)

(72) Inventors: Hadas Bitran, Ramat HaSharon (IS); Marc E. Davis, Redmond, WA (US); Haim Somech, Ramat Gan (IS); Ho John Lee, Palo Alto, CA (US); Allen G. Jones, Redmond, WA (US); Oded Nahir, Herzliya (IS); Jeffrey D. Friedberg, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 49 days.

(21) Appl. No.: 13/838,078

(22) Filed: Mar. 15, 2013

(65) Prior Publication Data

US 2014/0282825 A1    Sep. 18, 2014

(51) Int. Cl.
*G06F 17/00*      (2006.01)
*H04L 29/06*     (2006.01)
(Continued)

(52) U.S. Cl.
CPC ............. *G06F 21/00* (2013.01); *G06F 21/604* (2013.01); *G06F 21/62* (2013.01); *G06F 2221/2141* (2013.01); *H04L 63/10* (2013.01)

(58) Field of Classification Search
CPC ................. G06F 21/10–21/121; G06F 21/128; G06F 21/604; G06F 21/645; G06F 2221/2115; G06F 2221/2145; H04W 12/00; H04W 12/02; H04W 12/08; H04L 63/10; H04L 41/0246; H04L 41/0893; H04L 12/244; H04L 12/2642; H04L 12/2829; H04L 29/08675
(Continued)

(56) References Cited

U.S. PATENT DOCUMENTS 7,225,460 B2 *  5/2007  Barzilai ............... G06F 21/604
                                                                   709/217
7,707,413 B2     4/2010  Lunt et al.
(Continued)

OTHER PUBLICATIONS

"Why Privacy Matters", Retrieved on: Feb. 4, 2013, Available at: http://www.reputation.com/myprivacy.
(Continued)

*Primary Examiner* — Daniel Potratz
(74) *Attorney, Agent, or Firm* — Steven Spellman; Tom Wong; Micky Minhas

(57) ABSTRACT

Systems, methods, and computer-readable storage media are provided for managing policy and permissions profiles. Individuals or organizations are permitted to author profiles utilizing a profile template and publish such authored profiles for access and adoption by others. Users are able to import desired profiles and subsequently have those imported profiles applied each time he or she accesses an application or service to which the profile pertains. User interfaces from which users may view profiles associated with them, make alterations to settings of profiles associated with them, and/or select from a plurality of profiles for a particular application or service are also provided. Still further, recommendations may be provided to users for policy and permissions profiles based upon, for instance, crowd-sourcing, profiles adopted by social network connections of a user or other users that are "like" a user, prior profile selections made by the user, and/or prior user behavior.

20 Claims, 6 Drawing Sheets

(51) Int. Cl.
*G06F 21/00* (2013.01)
*G06F 21/60* (2013.01)
*G06F 21/62* (2013.01)

(58) Field of Classification Search
USPC .................................................... 726/26–28
See application file for complete search history.

(56) References Cited

U.S. PATENT DOCUMENTS

| | | | |
|---|---|---|---|
| 8,621,558 B2* | 12/2013 | Gilchrist et al. ................... | 726/1 |
| 8,813,176 B2* | 8/2014 | Jones ................ | G06F 17/30675 |
| | | | 707/999.102 |
| 8,844,036 B2* | 9/2014 | Saidi ................... | G06F 21/6218 |
| | | | 726/1 |
| 9,055,110 B2* | 6/2015 | El Houmaidi ........ | G06F 21/552 |
| 2007/0124739 A1 | 5/2007 | Culbreth et al. | |
| 2008/0141366 A1 | 6/2008 | Cross et al. | |
| 2008/0282314 A1* | 11/2008 | Abzarian et al. .................. | 726/1 |
| 2008/0288330 A1 | 11/2008 | Hildebrand et al. | |
| 2009/0240769 A1 | 9/2009 | Schran | |
| 2009/0328209 A1 | 12/2009 | Nachenberg | |
| 2010/0010824 A1 | 1/2010 | Kim et al. | |
| 2010/0036779 A1* | 2/2010 | Sadeh-Koniecpol ... | H04L 63/20 |
| | | | 706/11 |
| 2010/0077484 A1* | 3/2010 | Paretti ................. | G06F 21/6245 |
| | | | 726/26 |
| 2010/0312714 A1 | 12/2010 | Ourega | |
| 2011/0030045 A1 | 2/2011 | Beauregard et al. | |
| 2013/0014020 A1 | 1/2013 | Dixon et al. | |

OTHER PUBLICATIONS

"International Search Report & Written Opinion for PCT Application No. PCT/US2014/028907", Mailed Date: Jul. 3, 2014, Filed Date: Mar. 14, 2014, 8 Pages.

Second Written Opinion of the International Preliminary Examining Authority dated Mar. 3, 2015 in Application No. PCT/US2014/028907, 6 pages.

"International Preliminary Report on Patentability Issued in PCT Patent Application No. PCT/US2014/028907", Mailed Date: Jun. 16, 2015, 7 Pages.

* cited by examiner

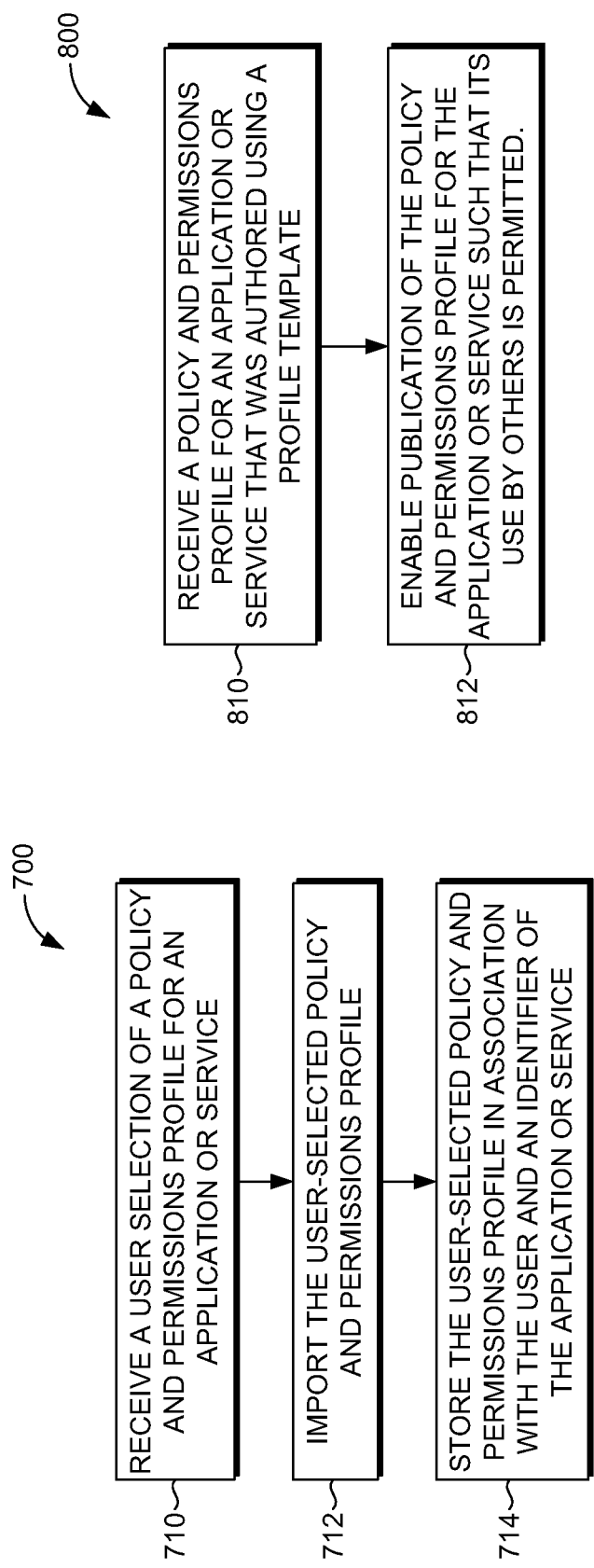

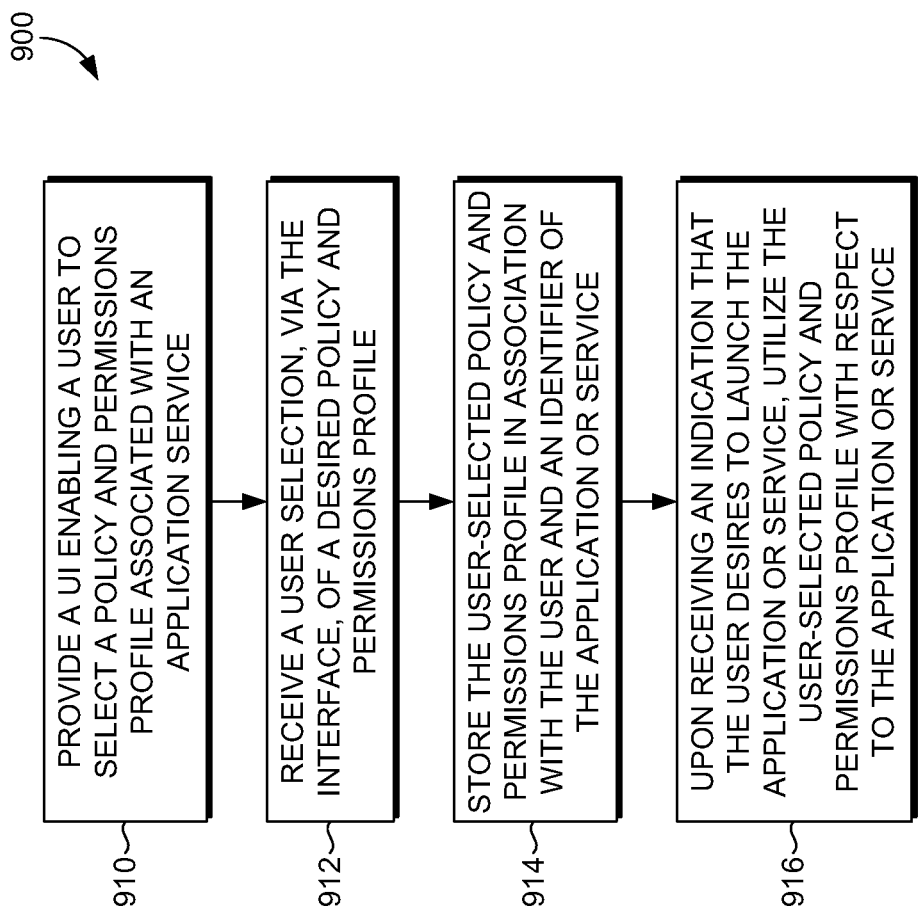

MANAGING POLICY AND PERMISSIONS PROFILES

BACKGROUND

Many applications and services are personalized based upon the application or service utilizing a user's personal data in order to provide enhanced experiences. When a user gets to a point where he has to make a decision whether to share a particular item of personal data with a certain application or service, such as sharing location data or browsing history upon installation or launch of an application, the user needs to decide whether or not he trusts the application and whether sharing his personal data with the application is worthwhile. If the application is from a well-known, respectful vendor, this decision is easier for the user to make. However, sometimes a user has no way of knowing whether a particular application or service is trustworthy and will not attempt to mis-use his personal data, or whether the application or service gives enough value in return for his data.

Application reputation mechanisms exist that may help the user make this type of decision. However, these mechanisms are limited in that they typically contain a ranking based on how appealing the application or service is to users—and not whether the application is from a trustworthy source, whether the application or application vendor misuses personal data or leaks it, or whether the application gives enough value in return for sharing data with it. Moreover, such ranking typically gives all those providing a ranking the same weight, without taking into account the credibility or the thought leadership of the ranker in a certain domain. Moreover, if a user has given consent in the past to an application or service to use his personal data, and the application turns out to be malicious or performing data abuse or privacy violations, the user has no way of knowing that and revoking access to his data for this bad application or service.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In various embodiments, systems, methods, and computer-readable storage media are provided for managing policy and permissions profiles, e.g., privacy policy and permissions profiles. Individuals or organizations are permitted to author policy and permissions profiles utilizing a profile template and publish such authored profiles for access and adoption by others. Users are able to import desired policy and permissions profiles and subsequently have those imported profiles applied each time he or she accesses an application or service to which the profile pertains. Embodiments of the present invention additionally provide a user interface from which users may view policy and permissions profiles associated with them, make alterations to one or more settings of policy and permissions profiles associated with them, and/or select from a plurality of policy and permissions profiles for a particular application or service. Still further, recommendations may be provided to users for policy and permissions profiles based upon, for instance, crowd-sourcing, policy and permissions profiles adopted by social network connections of a user, policy and permissions profiles adopted by other users that are "like" a user, prior policy and permissions profiles adopted by the user, and/or prior user behavior.

BRIEF DESCRIPTION OF THE DRAWINGS

The present invention is illustrated by way of example and not limitation in the accompanying figures in which like reference numerals indicate similar elements and in which:

FIG. 7 is a flow diagram showing an exemplary method for managing policy and permissions profiles, in accordance with an embodiment of the present invention;

FIG. 8 is a flow diagram showing another exemplary method for managing policy and permissions profiles, in accordance with an embodiment of the present invention; and FIG. 9 is a flow diagram showing yet another exemplary method for managing policy and permissions profiles, in accordance with an embodiment of the present invention.

DETAILED DESCRIPTION

Figure 1:
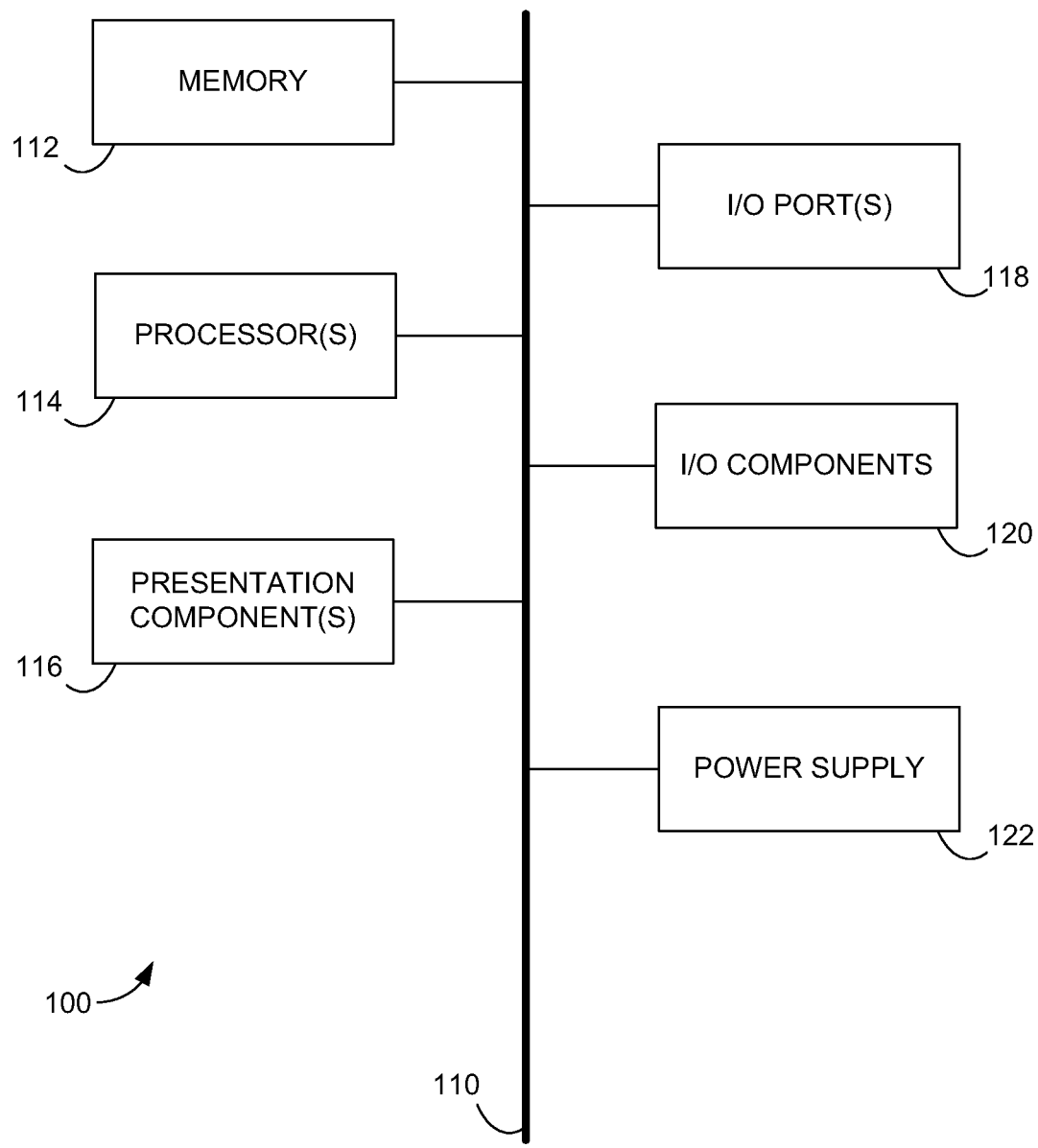
FIG. 1 is a block diagram of an exemplary computing environment suitable for use in implementing embodiments of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Various aspects of the technology described herein are generally directed to systems, methods, and computer-readable storage media for managing policy and permissions profiles. Policy and permissions profiles are sets of permissions concerning the access to and use of users' personal data. Such permissions may be directed to, by way of example only, location data, browsing history, interests, brand preferences, and the like. Permissions may be individually provided for each item of personal data or may be provided in accordance with an overall policy adopted by the user. Further, permissions may be provided on an application- or service-specific basis or on a more general level such that they are intended to apply to all applications and services, all applications and services offered by a particular vendor, or all applications and services of a particular type (e.g., shopping, gaming, etc.). Any and all such variations, and any combination thereof, are contemplated to be within the scope of embodiments of the present invention.

Use of the term "policy and permissions profile" herein is not intended to encompass any default permissions that are provided as part of an application or service upon acquisition or configuration. That is, "policy and permissions profile" as used herein is intended to relate to any policy and permissions profile authored by parties other than the application or service itself as a default setting, even if such third-party-authored profiles include settings identical to or substantially similar to the default settings. Thus, policy and permissions profiles in accordance with embodiments are different than default policy and permissions profiles provided in conjunction with an application or service.

In accordance with embodiments hereof, individuals or organizations are permitted to author policy and permissions profiles utilizing a profile template and export and publish such authored profiles for access and adoption by others. Accordingly, one embodiment of the present invention is directed to a method being performed by one or more computing devices including at least one processor, the method comprising receiving a policy and permissions profile for an application or service, the policy and permissions profile being authored utilizing a profile template and being different than a default policy and permissions profile provided in conjunction with the application or service; and enabling publication of the policy and permissions profile for the application or service such that its use by others is permitted.

Various aspects of the technology described herein further are directed to systems, methods, and computer-readable storage media for enabling users to import desired policy and permissions profiles and subsequently have those imported profiles applied each time he or she accesses an application or service to which the profile pertains. As such, another embodiment of the present invention is directed to one or more computer-readable storage media storing computer-useable instructions that, when used by one or more computing devices, cause the one or more computing devices to perform a method comprising receiving a user selection of a policy and permissions profile for a first application or service; importing the user-selected policy and permissions profile; and storing the user-selected policy and permissions profile in association with the user and an identifier of the first application or service. The user-selected policy and permissions profile is different than a default policy and permissions profile provided in conjunction with the first application or service In yet another embodiment, the present invention is directed to a system comprising a policy and permissions engine having one or more processors and one or more computer-readable storage media, and a data store coupled with the policy and permissions engine. The policy and permissions engine is configured to provide a user interface that enables a user to select one of a plurality of policy and permissions profiles associated with a first application or service, at least a portion of the plurality of policy and permissions profiles being different than a default policy and permissions profile provided in conjunction with the first application or service. The policy and permissions engine is further configured to receive a user selection, via the user interface, of one of the plurality of policy and permissions profiles associated with the first application or service; store the user-selected policy and permissions profile in association with the user and an identifier of the first application or service; and upon receiving an indication that the user desires to launch the first application or service, utilize the user-selected policy and permissions profile with respect to the first application or service.

Further embodiments of the present invention provide a user interface from which users may view policy and permissions profiles associated with them, make alterations to one or more settings of policy and permissions profiles associated with them, and/or select from a plurality of policy and permissions profiles for a particular application or service. Still further, recommendations may be provided to users for policy and permissions profiles based upon, for instance, crowd-sourcing, policy and permissions profiles adopted by social network connections of a user, policy and permissions profiles adopted by other users that are "like" a user, prior policy and permissions profiles adopted by the user, and/or prior user behavior.

Having briefly described an overview of embodiments of the present invention, an exemplary operating environment in which embodiments of the present invention may be implemented is described below in order to provide a general context for various aspects of the present invention. Referring to the figures in general and initially to FIG. 1 in particular, an exemplary operating environment for implementing embodiments of the present invention is shown and designated generally as computing device 100. The computing device 100 is but one example of a suitable computing environment and is not intended to suggest any limitation as to the scope of use or functionality of embodiments of the invention. Neither should the computing device 100 be interpreted as having any dependency or requirement relating to any one component nor any combination of components illustrated.

Embodiments of the invention may be described in the general context of computer code or machine-useable instructions, including computer-useable or computer-executable instructions such as program modules, being executed by a computer or other machine, such as a personal data assistant or other handheld device. Generally, program modules include routines, programs, objects, components, data structures, and the like, and/or refer to code that performs particular tasks or implements particular abstract data types. Embodiments of the invention may be practiced in a variety of system configurations, including, but not limited to, hand-held devices, consumer electronics, general-purpose computers, more specialty computing devices, and the like. Embodiments of the invention may also be practiced in distributed computing environments where tasks are performed by remote-processing devices that are linked through a communications network.

With continued reference to FIG. 1, the computing device 100 includes a bus 110 that directly or indirectly couples the following devices: a memory 112, one or more processors 114, one or more presentation components 116, one or more input/output (I/O) ports 118, one or more I/O components 120, and an illustrative power supply 122. The bus 110 represents what may be one or more busses (such as an address bus, data bus, or combination thereof). Although the various blocks of FIG. 1 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

The computing device 100 typically includes a variety of computer-readable media. Computer-readable media may be any available media that is accessible by the computing device 100 and includes both volatile and nonvolatile media, removable and non-removable media. Computer-readable media comprises computer storage media and communication media; computer storage media excluding signals per se. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 100. Communication media, on the other hand, embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The memory 112 includes computer-storage media in the form of volatile and/or nonvolatile memory. The memory may be removable, non-removable, or a combination thereof. Exemplary hardware devices include solid-state memory, hard drives, optical-disc drives, and the like. The computing device 100 includes one or more processors that read data from various entities such as the memory 112 or the I/O components 120. The presentation component(s) 116 present data indications to a user or other device. Exemplary presentation components include a display device, speaker, printing component, vibrating component, and the like.

The I/O ports 118 allow the computing device 100 to be logically coupled to other devices including the I/O components 120, some of which may be built in. Illustrative I/O components include a microphone, joystick, game pad, satellite dish, scanner, printer, wireless device, a controller, such as a stylus, a keyboard and a mouse, a natural user interface (NUI), and the like.

A NUI processes air gestures (i.e., motion or movements associated with a user's hand or hands or other parts of the user's body), voice, or other physiological inputs generated by a user. These inputs may be interpreted as policy and permissions profile selections, policy and permissions profile setting alterations, policy and permissions profile recommendations, and the like presented by the computing device 100. These requests may be transmitted to the appropriate network element for further processing. A NUI implements any combination of speech recognition, touch and stylus recognition, facial recognition, biometric recognition, gesture recognition both on screen and adjacent to the screen, air gestures, head and eye tracking, and touch recognition associated with displays on the computing device 100. The computing device 100 may be equipped with depth cameras, such as, stereoscopic camera systems, infrared camera systems, RGB camera systems, and combinations of these for gesture detection and recognition. Additionally, the computing device 100 may be equipped with accelerometers or gyroscopes that enable detection of motion. The output of the accelerometers or gyroscopes is provided to the display of the computing device 100 to render immersive augmented reality or virtual reality.

Aspects of the subject matter described herein may be described in the general context of computer-executable instructions, such as program modules, being executed by a mobile device. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices. The computer-useable instructions form an interface to allow a computer to react according to a source of input. The instructions cooperate with other code segments to initiate a variety of tasks in response to data received in conjunction with the source of the received data.

Furthermore, although the term "policy and permissions engine" is used herein, it will be recognized that this term may also encompass servers, Web browsers, sets of one or more processes distributed on one or more computers, one or more stand-alone storage devices, sets of one or more other computing or storage devices, any combination of one or more of the above, and the like.

Figure 2:
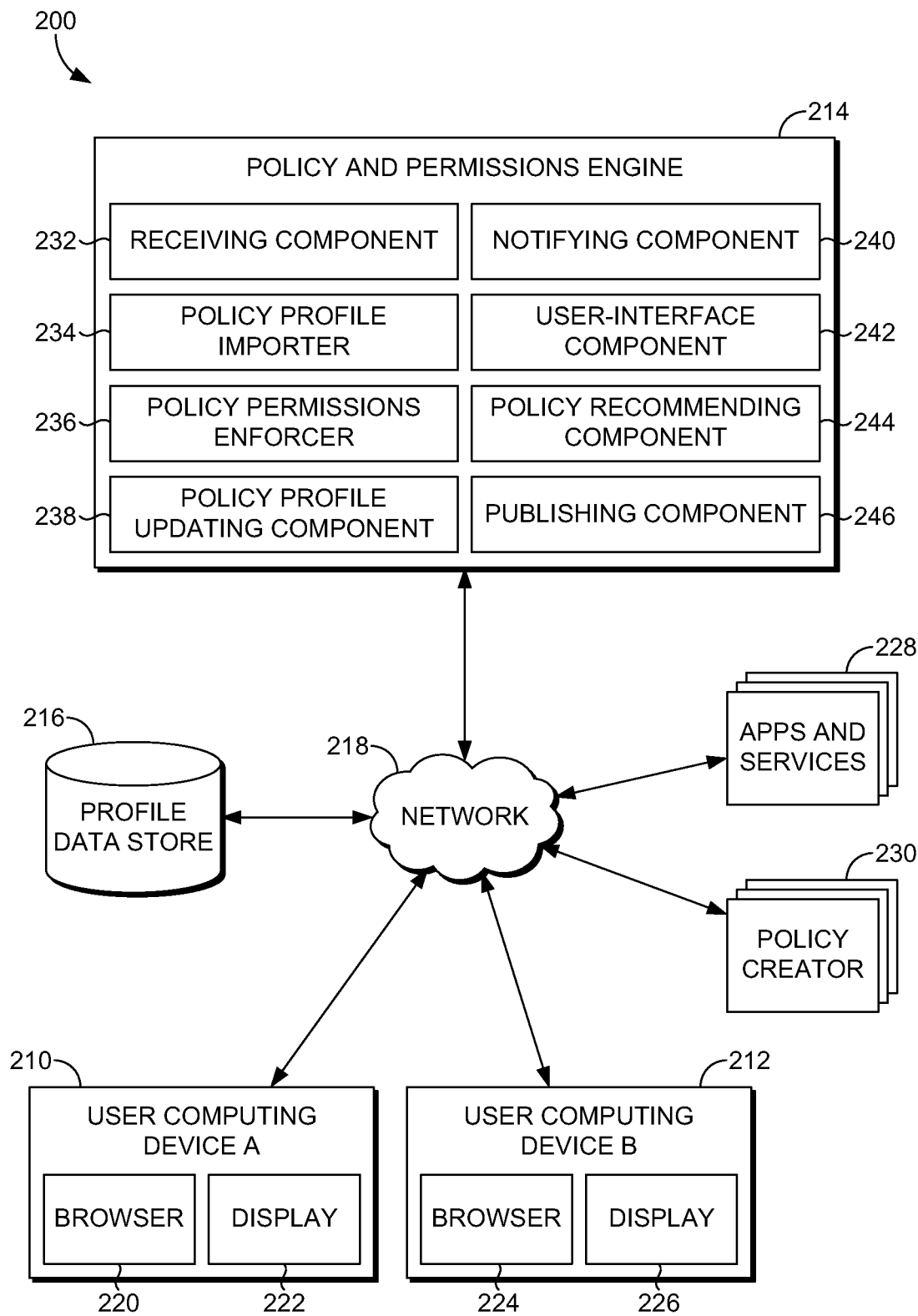
FIG. 2 is a block diagram of an exemplary computing system in which embodiments of the invention may be employed.

As previously mentioned, embodiments of the present invention are generally directed to systems, methods, and computer-readable storage media for managing policy and permissions profiles. Referring now to FIG. 2, a block diagram is provided illustrating an exemplary computing system 200 in which embodiments of the present invention may be employed. Generally, the computing system 200 illustrates an environment in which policy and permissions profiles may be authored, selected/adopted, altered, enforced, and/or recommended. Among other components not shown, the computing system 200 generally includes a plurality of user computing devices (user computing device A 210 and user computing device B 212) and a policy and permissions engine 214 in communication with one another via a network 218. The network 218 may include, without limitation, one or more local area networks (LANs) and/or wide area networks (WANs). Such networking environments are commonplace in offices, enterprise-wide computer networks, intranets and the Internet. Accordingly, the network 218 is not further described herein.

It should be understood that any number of user computing devices 210, 212 and/or policy and permissions engines 214 may be employed in the computing system 200 within the scope of embodiments of the present invention. Each may comprise a single device/interface or multiple devices/interfaces cooperating in a distributed environment. For instance, the policy and permissions engine 214 may comprise multiple devices and/or modules arranged in a distributed environment that collectively provide the functionality of the policy and permissions engine 214 described herein. Additionally, other components or modules not shown also may be included within the computing system 200.

In some embodiments, one or more of the illustrated components/modules may be implemented as stand-alone applications. In other embodiments, one or more of the illustrated components/modules may be implemented via one of the user computing devices 210, 212, the policy and permissions engine 214, or as an Internet-based service. It will be understood by those of ordinary skill in the art that the components/modules illustrated in FIG. 2 are exemplary in nature and in number and should not be construed as limiting. Any number of components/modules may be employed to achieve the desired functionality within the scope of embodiments hereof. Further, components/modules may be located on any number of policy and permissions engines and/or user computing devices. By way of example only, the policy and permissions engine 214 might be provided as a single computing device (as shown), a cluster of computing devices, or a computing device remote from one or more of the remaining components.

It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Each user computing device 210, 212 may include any type of computing device, such as the computing device 100 described with reference to FIG. 1, for example. Generally, the user computing devices 210, 212 include a browser 220 and 224, respectively, and a display 222 and 226, respectively. The browsers 220, 224, among other things, are configured to render user interfaces for authoring policy and permissions profiles, and for selecting policy and permissions profiles for adoption, in association with the displays 222 and 226, respectively, of the user computing devices 210, 212. The browsers 220, 224 are further configured to receive alterations to policy and permissions profiles (generally input via a user interface presented on the displays 222, 226 and permitting alpha-numeric and/or textual input into a designated search input region) and to receive content for presentation on the displays 222 and 226, respectively, for instance, from the policy and permissions engine 214. It should be noted that the functionality described herein as being performed by the browsers 220, 224 may be performed by any other application, application software, user interface, or the like capable of rendering Web content. It should further be noted that embodiments of the present invention are equally applicable to mobile computing devices and devices accepting touch and/or voice input. Any and all such variations, and any combination thereof, are contemplated to be within the scope of embodiments of the present invention.

The policy and permissions engine 214 of FIG. 2 is configured, among other things, to enable the authoring and publishing of policy and permissions profiles, enable user-selection and/or importing of policy and permissions profiles, recommend policy and permissions profiles to users (for instance, based on crowd-sourcing), enforce user-selected and/or imported policy and permissions profiles, and the like. As illustrated, the policy and permissions engine 214 includes a receiving component 232, a policy profile importer 234, a policy permissions enforcer 236, a policy profile updating component 238, a notifying component 240, a user-interface component 242, a policy recommending component 244, and a publishing component 246. The illustrated policy and permissions engine 214 also has access to a profile data store 216. The profile data store 216 is configured to store information related to policy and permissions profiles and user preferences related thereto. In various embodiments, such information may include, without limitation, user-imported policy and permissions profiles, user-selected policy and permissions profiles, alterations to policy and permissions profiles made by users, crowd-sourcing data related to policy and permissions profiles, and the like. In embodiments, the profile data store 216 is configured to be searchable for one or more of the items stored in association therewith. It will be understood and appreciated by those of ordinary skill in the art that the information stored in association with the profile data store 216 may be configurable and may include any information relevant to policy and permissions profiles associated with applications and/or services. The content and volume of such information are not intended to limit the scope of embodiments of the present invention in any way. Further, though illustrated as a single, independent component, the profile data store 216 may, in fact, be a plurality of storage devices, for instance a database cluster, portions of which may reside in association with the policy and permissions engine 214, one or more of the user computing devices 210, 212, another external computing device (not shown), and/or any combination thereof.

The receiving component 232 of the policy and permissions engine 212 is configured to receive inputs from policy and permissions profile users and authors. With respect to users, in embodiments, the receiving component 232 is configured to receive user selections of policy and permissions profiles for one or more applications or services. Such selections may be made via a user interface associated with the policy and permissions management system 200 (as more fully described below with reference to FIGS. 3 and 4), or made from a Web location outside of the policy and permissions management system 200. The receiving component 232 further is configured to receive indications that users desire to launch particular applications or services 228 having associated policy and permissions profiles. Still further, the receiving component 232 of the policy and permissions engine 212 is configured to receive changes or alterations to existing policy and permissions profiles associated with users.

Figure 6:
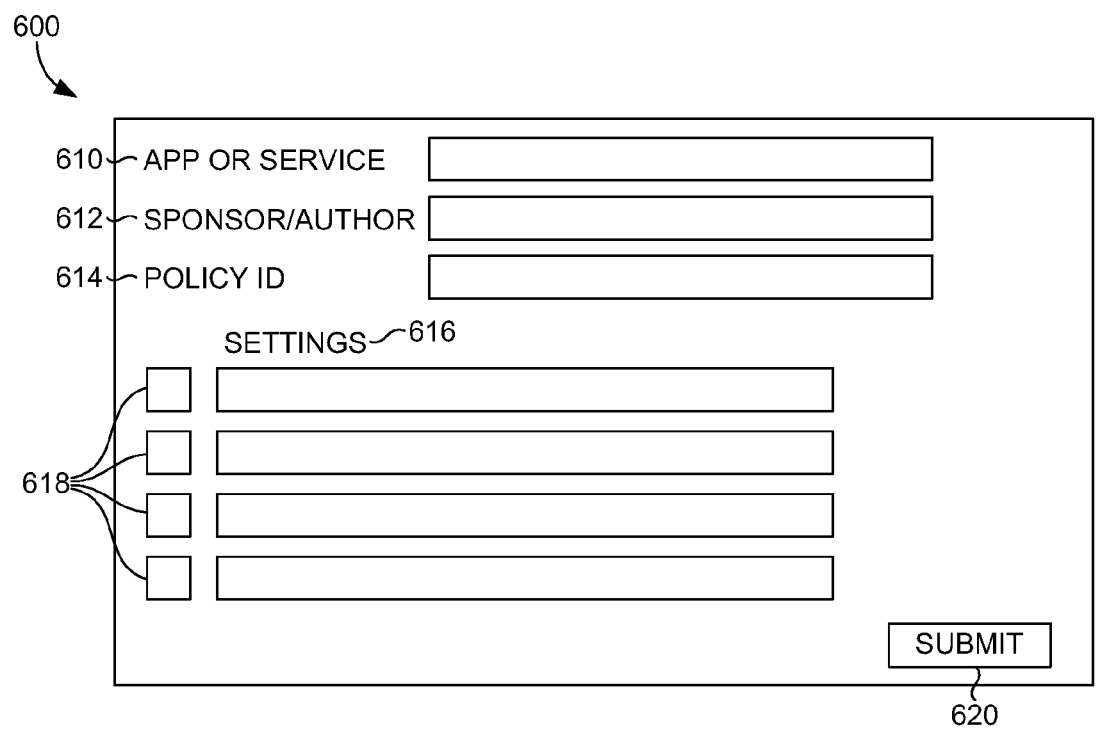
FIG. 6 is a schematic diagram showing an exemplary user interface of a template from which an individual or organization may author a policy and permissions profile, in accordance with an embodiment of the present invention.

With respect to authors or policy creators 230, in embodiments, the receiving component 232 of the policy and permissions engine 212 is configured to receive policy and permissions profiles authored using a profile template that permits the authored profiles to be made available for selection and adoption by others in accordance with the policy and permissions management system 200. An exemplary profile template is illustrated in FIG. 6 and more fully described below.

The policy profile importer 234 of the policy and permissions engine 212 is configured to import policy and permissions profiles accessed by users outside of the policy and permissions management system 200 into the policy and permissions management system 200. Generally, imported policy and permissions profiles are authored utilizing a profile template that makes them available for access and adoption by others, as more fully described below with reference to FIG. 6. By way of example and not limitation, a user may access a policy or permissions profile from a reputable privacy advocate (e.g., Christopher Soghoian) and/or an organization known for looking out for the interests of a particular segment of the population (e.g., AARP) and import the policy into the policy and permissions management system 200 utilizing the policy profile importer 234. Policy and permissions profiles, in embodiments, may be authored in a particular protocol language (e.g., CDRL) such that they can be exported as a distributable unit or file.

The policy permissions enforcer 236 of the policy and permissions engine 212 is configured to, upon receipt of an indication that a user desires to launch or otherwise access a particular application or service, query the profile data store for an applicable policy and permissions profile associated with the user, and apply the applicable profile to the application or service accessed by the user. In the event there are multiple policy and permissions profiles that may be applicable to a particular application or service, the policy and permissions management system 200 further may include a policy conflation component (not shown) to reconcile any conflicting permissions settings. That is, embodiments of the present invention permit users to configure how inconsistencies between policies should be handled and provide defaults, for instance, to always apply the strictest of all policies or the most up-to-date policy. For instance, a user may have adopted two policies for a particular application or service—a base policy and a more strict policy to complement it. In this instance, the policy conflation component (not shown) may apply the stricter permissions for any settings the more strict policy addresses and the base policy for all other settings. In embodiments, the conflation component (not shown) may further conflate policy entities such as application identifiers and versions or Data Type names. Embodiments of the present invention provide support for multiple versions for applications and services.

In embodiments, the policy permissions enforcer 236 further is configured to recognize and apply expiration dates on certain permissions for applications or services with respect to consumption of a particular type of personal information. For instance, a user may allow a particular application to access his or her location but only for the time period in which he or she is traveling and not thereafter.

The policy profile updating component 238 of the policy and permissions engine 212 is configured to update the policy and permissions profiles associated with one or more users upon receiving notification of a change. Such change may come directly from a user with respect to a particular policy and permissions profile associated with that user (for instance, utilizing the user interface illustrated in FIG. 5 and more fully described below). In this way, users may adopt an authored or sponsored policy and permissions profile and subsequently may override one or more settings with which the user does not agree. Alternatively, such desire may come more globally as a change by an author or sponsor of a policy and permissions profile, or in response to a monitoring service or the like providing information to the policy and permissions management system 200 that something has changed with respect to the trustworthiness of a particular application or service or with the benefit received by users in exchange for their personal data with respect to a particular application or service. Any and all such variations, and any combination thereof, are contemplated to be within the scope of embodiments of the present invention.

The notifying component 240 of the policy and permissions engine 212 is configured to notify the user of a change in a policy or permissions profile associated with that user. For instance, if an author or sponsor of a policy and permissions profile has changed one or more settings associated with that profile, the notifying component 240 is configured to notify any user that has adopted the profile for one or more applications or services of the change. Similarly, if something changes with respect to the trustworthiness of a particular application or service or with the benefit received by users in exchange for their personal data with respect to a particular application or service, the notifying component is configured to notify the user of the change and/or, if the policy profile updating component 238 has changed the profile based upon the change, to notify the user that the profile has changed.

Figure 3:
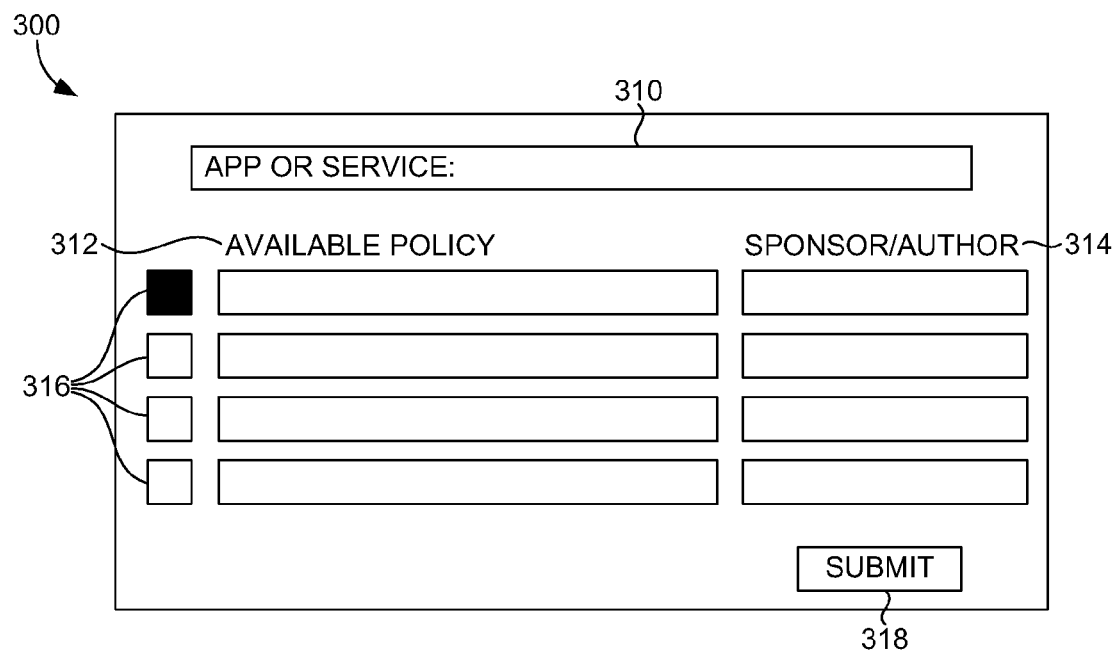
FIG. 3 is a schematic diagram showing an exemplary user interface from which users may select from a plurality of policy and permissions profiles available for a particular application or service, in accordance with an embodiment of the present invention.

The user-interface component 242 of the policy and permissions engine 212 is configured to enable user-facing applications or portals, where users can view current policy and permission profiles, import policy profiles, edit policy and permissions profiles, receive notifications about updates to policy and permission profiles and export/share policies with other users (e.g., between user A and user B). Thus user-facing application may be, but is not limited to, the MICROSOFT PERSONAL DATA DASHBOARD, offered by Microsoft Corporation of Redmond, Wash. As previously set forth, user selections of desired policy and permissions profiles may be made from a Web location outside of the policy and permissions management system 200 or via a user interface associated with the policy and permissions management system 200. Accordingly, in embodiments, the user-interface component 242 is configured to enable a user interface that permits a user to select one of a plurality of policy and permissions profiles associated with a given application or service. An exemplary profile selection user-interface 300 that is specific to a particular application or service is illustrated in FIG. 3. Illustrated in the exemplary profile selection user-interface 300 is an application or service identification area 310 to which the policy and permissions profiles shown in the user interface 300 may apply. Beneath the application or service identification area 310 is an available profile display area 312 where a listing of all available (that is, authored and published for consumption of others) profiles is presented. Also illustrated is a sponsor/author display area 314 wherein the sponsor or author of each policy and permissions profile may be identified. Such identification is intended to aid the user in selecting the profile that most appeals to him or her. Also illustrated are check boxes 316, one next to each available policy. A checked or selected check box 316 indicates that the user currently has selected the indicated profile to apply to the application or service identified in the application or service identification area 310. Selection of any of the available policy or sponsor/author fields 312, 314, respectively, illustrated in FIG. 3 causes presentation of additional details about the settings associated with the particular policy and permissions profile to which the selection pertains. An exemplary user interface illustrating detailed setting sentences of a selected available policy is set forth in the schematic diagram of FIG. 5, more fully described below.

Figure 4:
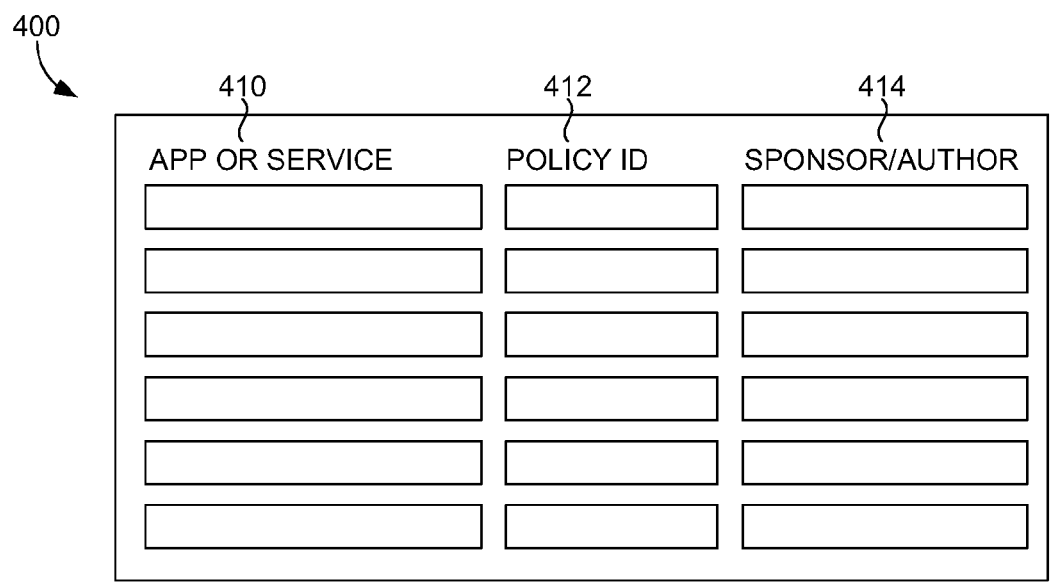
FIG. 4 is a schematic diagram showing an exemplary user interface from which users may view the policy and permissions profiles associated with them, in accordance with an embodiment of the present invention.

An exemplary profile selection user-interface that is more general and permits selection of policy and permissions profiles related to a plurality of different applications or services is illustrated in FIG. 4. Illustrated in the exemplary profile selection user-interface 400 is an application or service identification area 410 to which each listed policy and permissions profiles shown in the user interface 400 may apply. Next to the application or service identification area 410 is a policy identification area 412 where an identifier given to a particular policy and permissions profile by the author or sponsor thereof is identified. Also illustrated is a sponsor/author display area 414 wherein the sponsor or author of each policy and permissions profile may be identified. As in FIG. 3, such identification is intended to aid the user in selecting the profile/application or service combination that most appeals to him or her. Selection of any of the fields 410, 412, 414 illustrated in FIG. 4 causes presentation of additional details about the settings associated with the particular policy and permissions profile to which the selection pertains. An exemplary user interface illustrating detailed setting sentences of a selected available policy is set forth in the schematic diagram of FIG. 5.

Selection of one of the fields 312 or 314 of FIG. 3, or of one of the fields 410, 412 or 414 of FIG. 4, causes presentation of a user interface illustrating additional details about the settings associated with the particular policy and permissions profile to which the selection pertains. Such an exemplary user interface is shown in the schematic diagram of FIG. 5. As illustrated, the setting sentence detail user interface 500 of FIG. 5 includes an application or service identification area in which the application or service to which an identified policy and permissions profile applies is identified. Also illustrated is a policy identification field 512 for identification of the name or identifier given to the selected policy and permissions profile by the author or sponsor thereof and a sponsor/author identification field 514 for identification or such author or sponsor. Also shown are a series of setting sentences or options 516 for selection in authoring and/or altering a particular policy or permission profile. In the illustrated embodiment, the settings are offered as a series of options or sentences for selection (utilizing selection boxes 518). For instance, one setting sentence may indicate that all location data of the user is to be shared, another setting sentence may indicate that all brand preferences of the user are to be shared, and another setting sentence may indicate that interests of the user are to be shared. If the author or sponsor has provided for sharing of location data but not brand preferences or interests, only the check box 518 next to the setting sentence specifying sharing of location data would be checked. In other embodiments, open text fields permitting alpha-numeric or textual input may be provided instead of or in addition to standard, pre-authored setting sentences. Any and all such variations, and any combination thereof, are contemplated to be within the scope of embodiments of the present invention.

Figure 5:
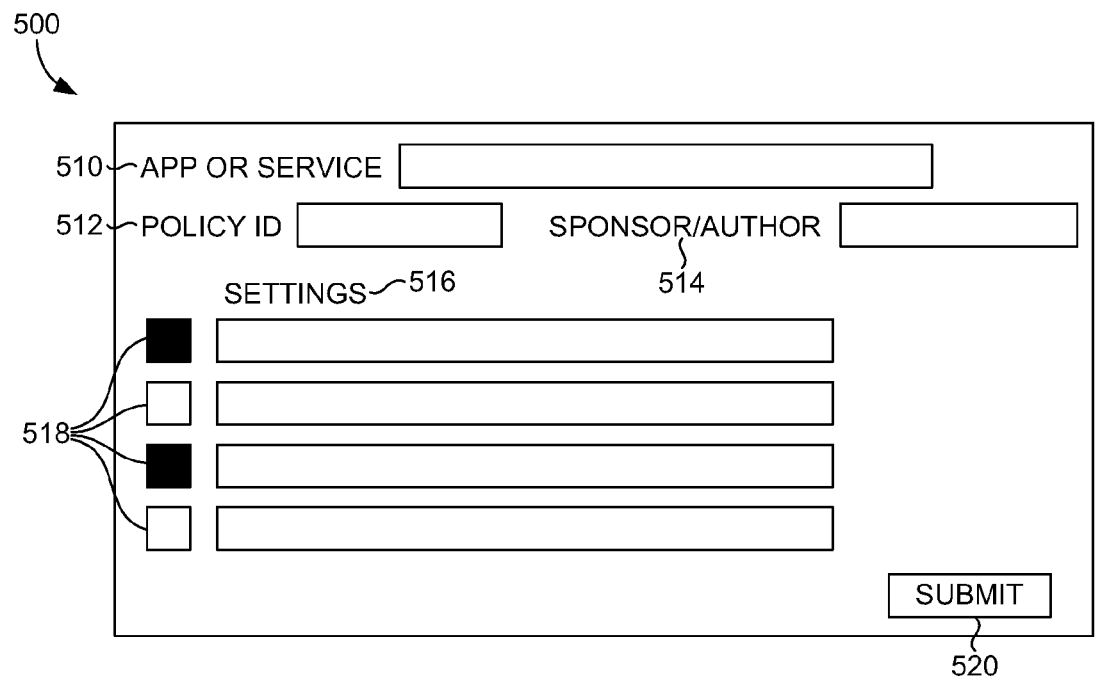
FIG. 5 is a schematic diagram showing an exemplary user interface from which a user may alter one or more settings of a policy and permissions profile, in accordance with an embodiment of the present invention.

It should be noted that a user interface 500 as shown in FIG. 5 may also be provided and utilized by users of the policy and permissions management system 200 of FIG. 2, for instance, to alter settings otherwise associated with a sponsored/authored policy and permissions profile. Selection or de-selection of various check boxes 518 may be engaged in by the user, after which the user may select the "submit" button 520 to save the changes.

Returning to FIG. 2, in embodiments, the user-interface component 242 further is configured to enable a user interface that provides a template for an author or sponsor of a policy and permissions profile to provide settings in association with the profile. An exemplary such authoring user interface is shown in FIG. 6. Illustrated in the policy and permissions profile authoring interface 600 of FIG. 6, is an application or service identifying user input area 610 permitting input (for instance, alpha-numeric or other textual input) of an application or service identifier to which the profile being authored is to apply. In embodiments, such identifier may specify a particular application or service, a particular type of application or service (e.g., gaming, shopping, and the like), or specify the profile is to apply to all applications and services. Also illustrated is a sponsor/author input area 612 wherein the author or sponsor of the profile is identified. A policy identifier input area 614 also is illustrated permitting the author or sponsor of the profile to name the policy for easier identification by users. The illustrated settings input area 616 is where the details of the policy and permissions are input by the author or sponsor. In the illustrated user interface 600, the settings are offered as a series of options or sentences for selection (utilizing selection boxes 618) by the author or sponsor. For instance, one setting sentence may indicate that all location data of the user is to be shared, another setting sentence may indicate that all brand preferences of the user are to be shared, and another setting sentence may indicate that interests of the user are to be shared. If the author or sponsor desires to provide for sharing of location data but not brand preferences or interests, only the check box 618 next to the setting sentence specifying sharing of location data would be selected. Once the policy and permissions profile is complete, the author or sponsor may select the "submit" indicator 620 causing the policy and permissions profile to be made available to others for selection and adoption. In this regard, the publishing component 246 of the policy and permissions engine 212 is configured to enable publication of policy and permissions profiles authored utilizing a profile template (e.g., the profile template shown in FIG. 6) such that its use by others is permitted.

With reference back to FIG. 2, the policy recommending component 244 of the policy and permissions engine 212 is configured to recommend policy and permissions profiles to users. Such recommendations may be based upon, by way of example only, crowd-sourcing (i.e., the "wisdom" of the crowd; what policy and permissions profile related to a particular application or service do most users adopt), policy and permissions profiles adopted by social network connections of the user (e.g., FACEBOOK friends), policy and permissions profiles adopted by other users of the policy and permissions system 200 that are "like" the user (e.g., in terms of interests, location, other profile similarities, and the like), prior policy and permissions profile choices of the user (e.g., policy and permissions profiles for a particular newly acquired application or service that are similar to profiles for other applications or services that have been adopted by the user), and prior behavior of the user (e.g., Web activity of the user that, though not specifically part of another policy and permissions profile, offers insight into the users preferred level of privacy). In embodiments, user behavior may be captured via a NUI that may be utilized, for instance, to determine emotions of a user such that these emotions may be utilized for recommending policy and permissions profiles to the user. In embodiments, such recommendations may be presented to the user via a user interface (for instance, a user interface similar to that shown in FIG. 3) upon the user acquiring or launching an application or service.

The following example illustrates how various components of the policy and permissions management system 200 of FIG. 2 may be utilized in conjunction with one another to create an environment where a user can feel in control of the ways in which her personal data is being used. Suppose a user, User A, installs a new Christmas gift recommendation application, SmartGift by 3P Deals, Inc. on her mobile device. Upon installation, the application requests access to her location data, interests and brand preferences, wherein location is required for the application to function properly, and interest and brands are optional. The user opts-in to sharing her location data and preferred brands with the application but not her interests.

User A now becomes interested in which other services and applications are using her location data. She accesses a user interface (provided by the policy and permissions management system 200 of FIG. 2) and views a list of all the application that consume her location, including the Christmas gift recommendation application she just installed. User A sees that the GameMe application that recommends games to her also wants to consume her location data. She decides this application should not have access to her location and removes the location access permissions for the GameMe application. She is now confused and unsure which applications to trust.

User A then accesses and reads a blog post by the well-known privacy advocate Christopher Soghoian, who just published a recommended privacy policy and permissions profile for sharing data with services. User A imports the privacy profile from his blog into her policy and permissions management system. Immediately, User A is able to see that her sharing settings are updated, and she now shares her brands and interests with SmartGift, which is considered an application with a good reputation. She is able to configure that her privacy policy and permissions profile will be updated automatically when the author publishes a new policy profile and asks to get notification when such an update happens. She then exports her own privacy policy and permissions profile to share it with her dad. Her dad receives an effective policy which blocks GameMe and enables access to SmartGift.

User A finally starts using SmartGift and gets great recommendations for top deals from her favorite brands in her city. After a few days, however, User A reads a troubling article about 3PDeals, Inc. She enters her policy and permissions management system and sees a notification that her privacy policy and permissions profile has been automatically updated. She also notices that SmartGift no longer has access to her location data.

Turning now to FIG. 7, a flow diagram is illustrated showing an exemplary method 700 for managing policy and permissions profiles, in accordance with an embodiment of the present invention. As shown at block 10, a user selection of a policy and permissions profile for a first application or service is received, for instance, utilizing the receiving component 232 of the policy and permissions engine 214 of FIG. 2. The user-selected policy and permissions profile is different than a default policy and permissions profile provided in conjunction with the application or service. As shown at block 712, the user-selected policy and permissions profile is imported, for instance, utilizing the policy profile importer 234 of the policy and permissions engine 214 of FIG. 2. The user-selected policy and permissions profile is stored in association with the user and an identifier of the application or service, for instance in profile data store 216 of FIG. 2, as indicated at block 714.

With reference now to FIG. 8, a flow diagram is illustrated showing another exemplary method 800 for managing policy and permissions profiles, in accordance with an embodiment of the present invention. As indicated at block 810, a policy and permissions profile for an application or service is received, for instance, utilizing the receiving component 232 of the policy and permissions engine 214 of FIG. 2. The received policy and permissions profile is authored utilizing a profile template and is different than a default policy and permissions profile provided in conjunction with the application or service. As indicated at block 812, publication of the policy and permissions profile for the application or service is enabled such that its use and adoption is permitted by others, for instance, utilizing the policy profile importer 234 of the policy and permissions engine 214 of FIG. 2.

With reference to FIG. 9, a flow diagram is illustrated showing yet another exemplary method 900 for managing policy and permissions profiles, in accordance with an embodiment of the present invention. As indicated at block 910, a user interface is provided that enables a user to select one or a plurality of policy and permissions profiles associated with a first application or service. This may be done, for instance, utilizing the user-interface component 242 of the policy and permission engine 214 of FIG. 2. At least a portion of the plurality of policy and permissions profiles are different than a default policy and permissions profile provided in conjunction with the first application or service. As shown at block 912, a user selection is received, via the user interface, of one of the plurality of policy and permissions profiles associated with the application or service. Such selection may be received, for instance, by the receiving component 232 of the policy and permissions engine 214 of FIG. 2. As shown at block 914, the user-selected policy and permissions profile is stored in association with the user and an identifier of the application or service (for instance, in the profile data store 216 of the policy and permissions management system 200 of FIG. 2). Upon receiving an indication that the user desires to launch the application or service, the user-selected policy and permissions profile is utilized with respect to the application or service, as indicated at block 916. Such may be done, for instance, utilizing the policy permissions enforcer 236 of the policy and permissions engine 214 of FIG. 2.

As can be understood, embodiments of the present invention provide systems, methods, and computer-readable storage media for, among other things, managing policy and permissions profiles. Individuals or organizations are permitted to author policy and permissions profiles utilizing a profile template and publish such authored profiles for access and adoption by others. Users are able to import desired policy and permissions profiles and subsequently have those imported profiles applied each time he or she accesses an application or service to which the profile pertains. Embodiments of the present invention additionally provide a user interface from which users may view policy and permissions profiles associated with them, make alterations to one or more settings of policy and permissions profiles associated with them, and/or select from a plurality of policy and permissions profiles for a particular application or service. Still further, recommendations may be provided to users for policy and permissions profiles based upon, for instance, crowd-sourcing, policy and permissions profiles adopted by social network connections of a user, policy and permissions profiles adopted by other users that are "like" a user, prior policy and permissions profile selections made by the user, and/or prior user behavior.

The present invention has been described in relation to particular embodiments, which are intended in all respects to be illustrative rather than restrictive. Alternative embodiments will become apparent to those of ordinary skill in the art to which the present invention pertains without departing from its scope.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

It will be understood by those of ordinary skill in the art that the order of steps shown in the methods 700 of FIG. 7, 800 of FIG. 8, and 900 of FIG. 9 is not meant to limit the scope of the present invention in any way and, in fact, the steps may occur in a variety of different sequences within embodiments hereof. Any and all such variations, and any combination thereof, are contemplated to be within the scope of embodiments of the present invention.

What is claimed is:

1. One or more computer-readable storage media storing computer-useable instructions that, when used by one or more computing devices, cause the one or more computing devices to perform a method for managing policy and permissions profiles, the method comprising:
   presenting a plurality of policy and permissions profiles associated with a first application or service, on a device, wherein each of the plurality of policy and permissions profiles:
      excludes default permissions of a default policy and permissions profile provided in conjunction with the first application or service;
      is predefined by a third-party policy and permissions author, the third-party policy and permissions author being a party other than a provider of the first application or service;
      is presented with an identification of the third-party policy and permissions author; and
      corresponds to an access to and use of personal data by the first application or service;
   receiving a user selection of a policy and permissions profile of the plurality of policy and permissions profiles associated with the first application or service;
   importing the user-selected policy and permissions profile for use in association with the first application or service; and
   storing the user-selected policy and permissions profile in association with the user and an identifier of the first application or service.

2. The one or more computer-readable storage media of claim 1, wherein the method further comprises:
   receiving an indication that the user desires to launch the first application or service; and
   utilizing the user-selected policy and permissions profile with respect to the first application or service.

3. The one or more computer-readable storage media of claim 1, wherein the user-selected policy and permissions profile includes one or more settings associated therewith, and wherein the method further comprises:
   receiving a notification of a change to at least one of the one or more settings associated with the user-selected policy and permissions profile; and
   changing the at least one of the one or more settings in the user-selected policy and permissions profile stored in association with the user.

4. The one or more computer-readable storage media of claim 3, wherein the method further comprises notifying the user of the change in the user-selected policy and permissions profile.

5. The one or more computer-readable storage media of claim 1, wherein the method further comprises providing a user interface that enables the user to select one of a plurality of policy and permissions profiles associated with a second application or service.

6. The one or more computer-readable storage media of claim 5, wherein providing the user interface that enables the user to select one of the plurality of policy and permissions profiles associated with the second application or service comprises recommending one or more of the plurality of policy and permissions profiles associated with the second application or service to the user.

7. The one or more computer-readable storage media of claim 6, wherein recommending the one or more of the plurality of policy and permissions profiles associated with the second application or service to the user comprises recommending the one or more of the plurality of policy and permissions profiles associated with the second application or service based upon crowd-sourcing.

8. The one or more computer-readable storage media of claim 6, wherein recommending the one or more of the plurality of policy and permissions profiles associated with the second application or service to the user comprises recommending the one or more of the plurality of policy and permissions profiles associated with the second application or service based upon selections made by at least one of social network connections of the user and other users that are similar to the user.

9. The one or more computer-readable storage media of claim 6, wherein recommending the one or more of the plurality of policy and permissions profiles associated with the second application or service to the user comprises recommending the one or more of the plurality of policy and permissions profiles associated with the second application or service based upon prior policy and permissions profile choices of the user.

10. The one or more computer-readable storage media of claim 6, wherein recommending the one or more of the plurality of policy and permissions profiles associated with the second application or service to the user comprises recommending the one or more of the plurality of policy and permissions profiles associated with the second application or service based upon prior behavior of the user.

11. The one or more computer-readable storage media of claim 1, wherein the method further comprises enabling a user interface that permits the user to view any policy and permissions profiles associated with the user.

12. The one or more computer-readable storage media of claim 1, wherein the method further comprises enabling a user interface that permits the user to alter any policy and permissions profiles associated with the user.

13. A method being performed by one or more computing devices including at least one processor, the method for managing policy and permissions profiles, the method comprising:
   providing a policy and permissions profile template for an application or service, on a computing device, the policy and permissions profile template having an input area for inputting settings corresponding to an access to and use of personal data by the application or service;
   receiving a policy and permissions profile for the application or service, wherein the policy and permissions profile:
      is based on the policy and permissions profile template;
      is authored utilizing the policy and permissions profile template;
      excludes default permissions of a default policy and permissions profile provided in conjunction with the application or service;

is presented with an identification of a third-party policy and permissions author, wherein the third-party policy and permissions author is a party other than the provider of the application or service; and is configured to be exported to a user device and used in association with the application or service on the user device; and publishing the policy and permissions profile for the application or service with an indication of the source of the policy and permissions profile, wherein publishing the policy and permissions profile causes the policy and permissions profile to be available for use by a plurality of users of the application or service upon a selection of the policy and permissions profile by a user of the plurality of users.

14. The method of claim 13, further comprising providing a user interface for authoring of the policy and permissions profile for the application or service in accordance with the profile template.

15. The method of claim 13, further comprising providing a user interface for selection of the policy and permissions profile for use with the application or service.

16. The method of claim 13, further comprising:

receiving a selection by a user of a desire to launch the application or service; and recommending the policy and permissions profile to the user for use with the application or service.

17. The method of claim 16, wherein recommending the policy and permissions profile to the user for use with the application or service is based on at least one of crowd-sourcing, selections made by social network connections of the user, selections made by other users that are similar to the user, prior policy and permissions profile choices of the user, or prior behavior of the user.

18. A system comprising:

a policy and permissions engine having one or more processors and one or more computer-readable storage media; and a data store coupled with the policy and permissions engine;

wherein the policy and permissions engine:

provides a policy and permissions profile template for a first application or service that enables a third-party policy and permissions author to create and publish a policy and permissions profile for use by a plurality of users of the first application or service, wherein the policy and permissions profile template corresponds to the access to and use of personal data by the first application or service;

provides a user interface that enables a user to select one of a plurality of policy and permissions profiles associated with the first application or service, wherein each policy and permissions profile of the plurality of policy and permissions profiles:

excludes default permissions of a default policy and permissions profile provided in conjunction with the first application or service;

is predefined by the third-party policy and permissions author, the third-party policy and permissions author being a party other than a provider of the first application or service; and is presented with an identification of the third-party policy and permissions author;

receives a user selection, via the user interface, of one of the plurality of policy and permissions profiles associated with the first application or service;

imports the user-selected policy and permissions profile for use in association with the first application or service;

stores the user-selected policy and permissions profile in association with the user and an identifier of the first application or service;

upon receiving an indication that the user desires to launch the first application or service, utilizes the user-selected policy and permissions profile with respect to the first application or service; and updates the user-selected policy and permissions profile upon detecting a change to at least one setting associated with the user-selected policy and permissions profile.

19. The system of claim 18, wherein the user-selected policy and permissions profile includes one or more settings associated therewith, and wherein the policy and permissions engine further:

receives a notification of a change to at least one of the settings associated with the user-selected policy and permissions profile; and notifies the user of the change to the at least one of the settings.

20. The system of claim 18, wherein the policy and permissions engine further provides a user interface that recommends one or more of a plurality of policy and permissions profiles associated with a second application or service to the user, the recommendation being based upon one or more of crowd-sourcing, social network connections of the user, selections made by other users that are similar to the user, prior policy and permissions profile choices of the user, or prior behavior of the user.

* * * * *